Dec. 13, 1955   J. H. GEFFEN   2,726,549
GRADUATED MEASURING DEVICE
Filed March 27, 1953
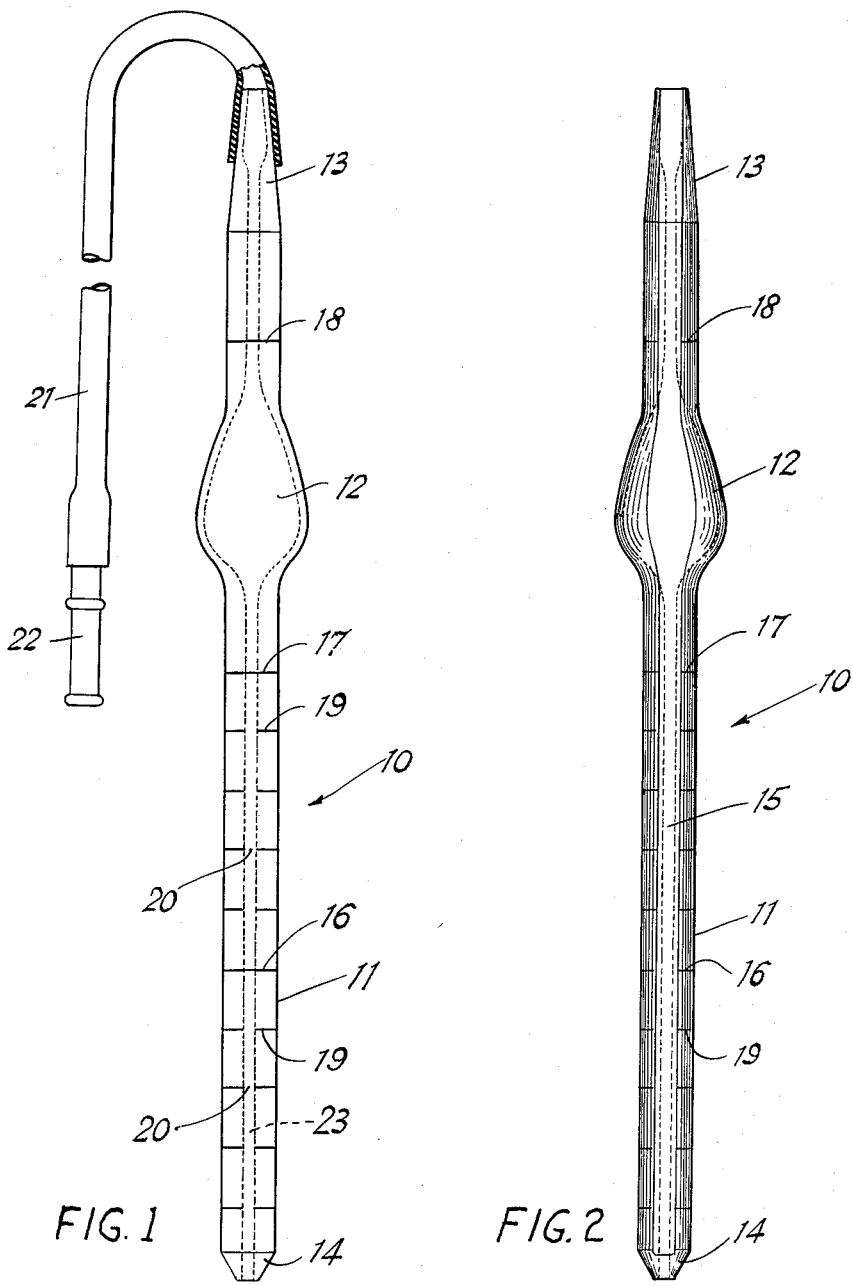
INVENTOR
James H. Geffen
BY
ATTORNEY United States Patent Office 2,726,549
Patented Dec. 13, 1955

2,726,549

GRADUATED MEASURING DEVICE

James H. Geffen, Scarsdale, N. Y., assignor to Clay-Adams, Inc., New York, N. Y., a corporation of New York Application March 27, 1953, Serial No. 345,081

2 Claims. (Cl. 73—425.4)

This invention relates to graduated measuring devices such as pipettes, thermometers and the like.

An object of this invention is to provide in devices adapted to measure a column of liquid or the like, such as pipettes, thermometers or the like, graduations or measuring indicia so presented to the eye as to avoid any possibility of confusion when taking a reading of the contents of the device.

Another object of this invention is to provide in a device of the character described having spaced major graduations indicating a given unitary quantity between successive graduations, together with spaced secondary graduations located intermediate each pair of major graduations for indicating fractional portions of said unitary quantity, the secondary graduations having a visibly different appearance from the major graduations to avoid possibility of confusion between the two types of graduations.

A further object of this invention is to provide in a device of the character described, major graduations spaced longitudinally along the stem thereof and extending continuously and circumferentially about the front thereof, together with spaced graduations located between the major graduations, each of the latter graduations being interrupted in the circumferential extent thereof at points on the front of the device where readings are to be taken, the interrupted graduations being readily distinguished from the continuous graduations.

Other objects of this invention will in part be obvious and in part hereinafter pointed out.

In the drawing,

Fig. 1 is a front elevational view of a device embodying the invention; and

Fig. 2 is a rear elevational view thereof.

The invention may be embodied in various transparent measuring devices having a stem or tubular portion bearing spaced graduations or markings for indicating the contents of the device. For the purpose of illustration, the invention is described in connection with a pipette 10, which may be one embodiment thereof. The pipette 10 comprises the usual tubular stem portion 11 having an enlarged portion as at 12, tapering somewhat at the upper end as at 13 and terminating at the lower end in a tip 14.

The pipette 10 is made of glass or other suitable transparent material and is provided along the back thereof with an opaque coating strip 15 having substantially parallel side edges, which may be white in color and which aids in gauging the level of the contents of the device.

The stem portion 11 bears a series of longitudinally spaced linear graduations 16, 17 and 18, each of said graduations extending circumferentially about the stem in a continuous manner from one side edge of the coating strip 15 to the other side edge thereof. Such graduations measure predetermined unitary quantities therebetween.

Located between graduations 16 and 17 and below graduation 16 are a plurality of longitudinally spaced intermediate linear graduations 19. Each graduation 19 extends circumferentially about stem 11 from the side edges of strip coating 15 but is interrupted on the front thereof to provide a pair of aligned ends which leave a clearly visible space 20. Such spaces 20 are longitudinally aligned along the stem portion and serve to clearly distinguish graduations 19 from graduations 16, 17.

The pipette 10 may be provided with a rubber tubing 21 which is removably attached at one end to the tapered end 13 of the pipette and has a mouthpiece 22 inserted in the other end thereof.

In using the pipette, the liquid drawn up in the same by way of the tubing 21 and mouthpiece 22, is in most cases measured in terms of the major graduations 16 or 17 to provide predetermined unitary quantities. By watching the front of the pipette, the eye can readily distinguish between the continuous graduations 16 or 17 and the intermediate graduations 19 which are interrupted. In this manner it is practically impossible to confuse the major and intermediate graduations and faulty readings are avoided.

The visible difference in the two types of graduations also facilitate the measurement of quantities which are fractions of the unitary quantity, in terms of the discontinuous graduations 19 on either side of major graduation 16 and below major graduation 17.

Both the continuous and interrupted graduations may be formed on the pipette stem by engraving procedures well known in the art or by any other suitable method. The spacing 20 between the inner ends of graduations 19 is sufficient to leave the bore 23 of the stem and the liquid content thereof clearly visible against the background of the back coating 15.

The instant invention may be embodied in various well known forms of pipettes and other graduation bearing tubular glass devices of somewhat similar type. Thus, the invention may also be embodied in thermometers, chemical glassware having graduated measuring portions, and the like.

As various possible embodiments might be made of the above described invention, and as various changes might be made in the embodiment described herein, it is understood that all matter set forth or shown in the accompanying drawing is to be interpreted as illustrative and not in a limiting sense.

Having thus disclosed my invention, I claim as new and desire to protect by Letters Patent:

1. A measuring device including a transparent, elongated portion bearing an opaque strip coating extending longitudinally and on the back thereof, a series of longitudinally spaced major linear graduations on said elongated portion and extending circumferentially and continuously from one side edge of said strip coating to the other side edge thereof, and a plurality of longitudinally spaced intermediate linear graduations located between successive major graduations, each of said intermediate graduations extending circumferentially from one side edge of said strip coating to the other side edge thereof and being interrupted at the front of said elongated portion to provide a pair of horizontally aligned graduation end portions with a space between the terminal ends thereof aligned with opposed portions of said strip coating on the back of said elongated portion.

2. A measuring device including a transparent, elongated portion bearing an opaque strip coating extending longitudinally and on the back thereof, a series of longitudinally spaced major linear graduations on said elongated portion and extending circumferentially and continuously about the front of said elongated portion, and a plurality of longitudinally spaced intermediate graduations located between successive major graduations, each of said intermediate graduations including a pair of linear portions extending circumferentially of said elongated portion with terminal ends thereof horizontally aligned and spaced from each other on the front of said elongated portion to provide a space therebetween which is aligned with opposed portions of said strip coating on the back of said elongated portion.

References Cited in the file of this patent

UNITED STATES PATENTS

| | | |
|---|---|---|
| 182,192 | Hicks et al. | Sept. 12, 1876 |
| 1,550,412 | Albrecht et al. | Aug. 18, 1925 |
| 2,158,045 | Palmer | May 9, 1939 |
| 2,303,154 | Armstrong | Nov. 24, 1942 |
| 2,358,936 | Mathis | Sept. 26, 1944 |
| 2,651,202 | Burns | Sept. 8, 1953 |

FOREIGN PATENTS

| | | |
|---|---|---|
| 3,662 | Great Britain | A. D. 1867 |
| 51,980 | Switzerland | May 28, 1910 |

OTHER REFERENCES

Meinecke & Co. (catalog), 1928, p. 172.